Patented Mar. 30, 1943

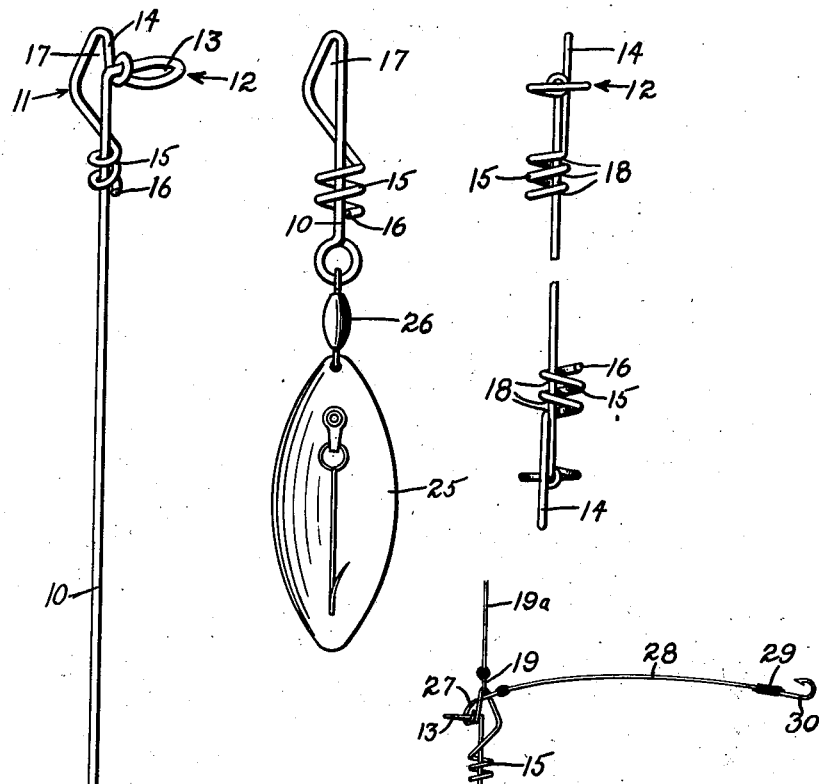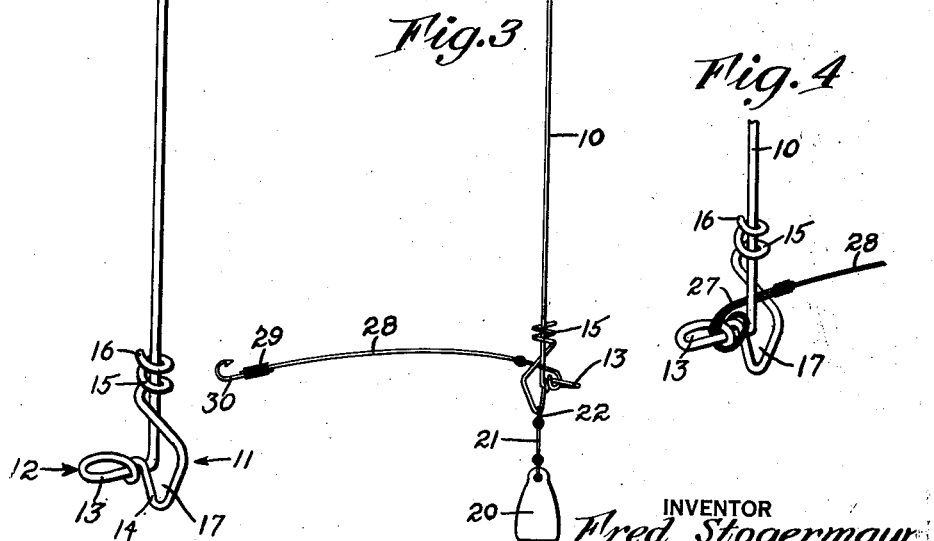

2,315,295

UNITED STATES PATENT OFFICE 2,315,295

FISHING TACKLE

Fred Stogermayr, Hoboken, N. J.

Application September 13, 1941, Serial No. 410,679

9 Claims. (Cl. 43—28)

The present invention relates to a fishing tackle, and, more particularly, to an improved means for attaching a tackle member to a looped line and attaching a snell to a tackle member.

In prior fishing tackles, it has been customary to provide a closed eye at the end of the tackle member through which the end of the line is threaded and secured in place by tying. To thus connect the line has been difficult at times due to the size of the eye on the tackle member and the condition of the line when it is fed through the eye. Furthermore, when it is desired to remove the tackle member from the line, it has usually been necessary to cut the line therefrom.

The present invention provides an improved means for easily and quickly attaching the tackle member to a looped line, whereby the loop of the line can be passed into the loop or eye of the tackle member by merely threading it over the coiled end of the tackle member so as to pass therein. The coiled end of the tackle member is so arranged that it presses against the shank of the member at spaced points so as to yieldably restrain passage of the line thereby and thus form a plurality of detents for preventing accidental displacement of the looped line from the loop of the tackle member while at the same time permitting the looped end to pass thereby upon application of force thereon.

The tackle member may be provided with the novel attaching means at either end thereof, or at both ends if desired, and may be utilized to support the tackle member from a fishing line and also support the attaching line for a sinker or the like. Preferably, the point of support is adjacent the shank so that the lines are in substantial alignment with the shank.

The novel attaching member can also be used to attach lures, spinners, or other like fishing equipment to a line.

Another feature of the invention resides in the means whereby the snell may be readily attached to the shank and held in position to project from the side of the shank.

In attaching the snell to the shank, a horizontally disposed loop on the shank opposite the line-attaching or vertically disposed loop is adapted to be passed through the looped end of the snell. The other end of the snell is threaded back through the loop and through the vertically disposed loop on the shank which guides the snell and holds it in its projected position. By threading it through the two loops, the snell is securely anchored to the shank, but may be readily removed for replacement or repair.

The tackle member may be of any desired length, and may be provided with one or more means for attaching the snells of hooks thereon.

In the preferred form of the invention, the shank is of substantial length and is provided with snell-attaching means adjacent each end on opposite sides thereof so that one hook will be disposed adjacent the surface on which the sinker rests while the other hook is on the other side of the shank and elevated substantially above it adjacent the position of the attachment of the tackle member to the fishing line.

If the shank of the tackle member is relatively short, the two hooks will be positioned substantially in the same plane, but project from opposite sides of the shank.

Other features and advantages of the invention will be apparent from the specification and claims when considered in connection with the drawing, in which:

Figure 1 shows a perspective of the tackle member.

Fig. 2 shows a side elevation of the tackle member with the shank broken away.

Fig. 3 shows the tackle member secured to a fishing line and a sinker line and having a pair of fish hooks secured by snells at opposite ends thereof.

Fig. 4 is a detail view of the snell-attaching and guiding means.

Fig. 5 shows a detail view of the attaching means for a spinner or the like.

As shown in the drawing, the preferred form of the invention is illustrated as applied to a tackle member having a substantially long shank 10 provided with a novel line attaching means 11 at both ends thereof and snell-attaching means 12 adjacent the line-attaching means 11.

While the shank may be of various materials, it is presently preferred to form it of a stiff, resilient wire. The two attaching means 11 and 12 formed are integral with the shank by bending the end of the wire of the shank at substantially right angles with the shank and twisting it to form a snell-attaching loop 13, which, as shown in Fig. 2, extends in a substantially horizontal plane with respect to the shank.

The end 14 of the wire is continued beyond the loop 13 and is bent back to a point below the loop 13, whereupon it is coiled about the shank to produce a coiled portion 15 having a free end 16. This produces a line-attaching loop 17 positioned in a vertical plane with respect to the shank and on the side of the shank opposite the loop 13. The loop 17 may be of various shapes, but the preferred form is substantially triangular with one side of the triangle formed as a continuation of the shank 10. The purpose of this relationship will be explained later.

It will be noted that in the preferred form of the invention the other end of the shank is provided wtih a similar loop structure. It is to be understood, however, according to the present invention the loops may be disposed solely at either the upper or lower end, and the line-attaching loops may be used with or without the snell-attaching loops.

As is shown in Fig. 2, the coil portion 15 is laterally displaced so as to yieldingly engage the shank at a plurality of spaced points 18.

When the member is to be attached to a line, the end 16 is passed through the looped end 19 of the fishing line 19a and the loop is moved along the coiled portion. When it reaches the part thereof in engagement with the shank, a pressure is applied in its direction of movement, forcing the coiled portion to yield and move away from the shank to permit passage of the looped line. This occurs at each point of contact of the coil portion with the shank, and after the looped line has been passed by the last detent, it moves into the loop 17 so as to suspend the tackle element therefrom.

The angularly disposed sides of the loop cause the looped line to move to the end of the loop and position the line in substantial alignment with the shank 10 so that the tackle member is suspended substantially vertically from the end of the line.

As is shown in Fig. 3, the other end of the tackle member may be provided with a sinker 20 supported by a sinker line 21 having a looped end 22. The looped end 22 is passed over the free end of the coiled portion and along the coiled portion in the same manner as the looped end of the fishing line, snapping past the points of engagement between the coiled portion and the shank as it is so moved.

When it has passed from the coiled portion, it enters the loop, and, through the action of the angularly disposed sides, is positioned at the bottom of the member in substantial alignment with the shank 10.

Thus it will be seen that the tackle member can be quickly supported from the fishing line and the sinker supported from the tackle member in proper position by means of the novel attaching means.

The point of engagement of the coiled portion with the shank prevents the tackle member from being accidentally disengaged from the loop and also prevents the sinker from becoming disengaged as it rests on the bed of the river or other such surface so as to be no longer held suspended from the loop.

While the tackle member is held against accidental disengagement from the fishing line and sinker line, nevertheless, when it is desired to remove the tackle member from the line, or the sinker from the tackle member, the same may be readily removed by guiding the looped end along the coiled portion and off the free end.

The shank 10 may have suspended from it a spinner or the like 25 secured thereto by means of a swivel 26. This form of the invention illustrates the use of the line-attaching means alone, the snell loop being omitted. In producing the line-attaching means, the end of the shank is bent back and has a coiled portion 15 and a free end 16 as described to form the attaching loop 17.

The spinner or the like, which is carried by the shank, can be attached to the looped end of a fishing line in the manner previously described so that the loop 17 is supported from the loop portion of the fishing line. When it is desired to replace the spinner or the like with another spinner or tackle member, it may be readily removed by passing the looped end of the fishing line along the coiled portion 15 and off the free end 16.

As is shown in Fig. 3, the horizontal loop 13 is disposed on the opposite side of the shank from the vertically disposed loop 17. When the pair of loops are formed at both ends of the shank member, they are so positioned with respect to one another that the loops 13 are on opposite sides of the shank so as to provide a vertical and horizontal loop on each side of the shank.

The horizontal loops, when employed with the vertical loops, provide a novel means for attaching the looped end 27 of a snell 28, which is secured by suitable means 29 to a fish hook 30, to the tackle member. This is accomplished by passing the looped end 27 of the snell over the horizontal loop 13 so that the snell lies along the shank 10. The free end of the snell, or that end having the fish hook secured thereto, is then threaded back through the loop 13 to lock the snell to the tackle member. The free end of the snell is then passed through the vertical loop and drawn therethrough until the looped end of the snell is tightly engaged about the loop 13. The stiffness of gut of the leader will cause the leader, as shown at the top of Fig. 3, to move in the direction of the shank and into engagement with the sides of the vertical loop, which will guide it into the upper angle and hold the snell in a projecting position on the opposite side of the shank from the attaching loop 13.

The inner engagement of the snell with the two loops will hold it against accidental disengagement from the tackle member. However, when it is desired to remove or replace the hook, the same may be readily accomplished by guiding the snell back through the vertical loop and horizontal loop, whereupon the looped end of the snell can be readily disengaged from the horizontal loop without in any way damaging the snell for subsequent reuse.

Variations and modifications may be made within the scope of this invention and portions of the improvements may be used without others.

I claim:

1. A fishing tackle member consisting of a wire comprising a shank, a pair of oppositely disposed integral loops extending from the shank, one loop being located in a transverse plane and the other in a parallel plane with respect to the plane of the shank, the transverse loop being adapted to be passed through a loop at one end of a snell and have the other end of the snell threaded back therethrough to lock the snell to the member and through the loop in the parallel plane to guide the snell and hold it projectant from the side of the shank opposite said loop in the transverse plane.

2. A device to facilitate attachment of a fishing tackle element having a hook or the like thereon to a line, said device consisting of a wire comprising a shank, a loop extending from the shank and adapted to have the hook or the like connected thereto, and an end portion extending back and around the shank in a coil to provide a loop at the end thereof, said coil being laterally displaced to yieldingly engage the shank at spaced points to form a plurality of detents and terminating in a free end, whereby a loop of the line can be passed over said free end and moved along said coil past the successive detents and into said second mentioned loop to interconnect therewith and support the device therefrom against accidental disengagement.

3. A fishing tackle member consisting of a wire comprising a shank, an integral loop extending from the shank at one end for attachment to a line, said integral loop being substantially triangular and having a top bend in alignment with the shank and an end portion of the wire extending back and around the shank in a coil, the latter being laterally displaced to yieldingly engage the shank at spaced points and terminating in a free end, whereby a loop of the line can be passed over said free end and along said coil to snap past the points of engagement between the coil and shank and into said integral loop, the angularly disposed sides of the loop guiding the line to said top bend and positioning the line in substantial alignment with the shank.

4. A fishing tackle member consisting of a resilient wire comprising a shank, an integral loop at each end for ready attachment thereof between a pair of lines, each end portion of the wire extending back and around the shank in a helical coil, the latter being each laterally displaced to engage the shank at spaced detent-like points and each terminating in a free end, whereby looped ends of the lines can be passed respectively over said free end and along the coils and snapped past said points of engagement of the coils with the shank and into the adjacent integral loop at the end of the shank to connect said lines, said detent-like points of engagement holding said lines against accidental disengagement from said integral loops.

5. A fishing tackle member consisting of a resilient wire comprising a shank, an integral loop extending from the shank at both ends for ready attachment thereof to the looped ends of a fishing line and a sinker, an end portion of the wire extending back and around the shank in a coil, said coil being laterally displaced to engage the shank at spaced points and terminating in a free end, whereby the free end of the coil at the upper end of the shank can have the looped end of the fishing line passed thereover and along the adjacent coil, and the free end of the coil at the lower end of the shank can have the looped end of the sinker line passed thereover and along the adjacent coil, the points of engagement with the shank forming yieldable detents which permit the lines to snap past said points upon application of pressure during movement of the lines along the coiled portions into the integral loops at the ends of the shank to connect said lines and support the shank from the fishing line and the sinker line from the shank, said detents holding said lines against accidental disengagement from said integral loops, and means on the shank intermediate the ends thereof for securing a fish hook or the like thereto.

6. A fishing tackle member consisting of a wire comprising a shank, a pair of integral loops extending from the shank at one end and on opposite sides of the shank, the loops being disposed one in a transverse plane and the other in a parallel plane with respect to the plane of the shank, a portion of the wire being twisted to form the transverse loop, and an end portion of the wire extending from the transverse loop in alignment with the shank and back and around the shank in a coil at a point below the transverse loop to form the parallel loop, whereby the parallel loop can be secured to and supported from a fishing line and the transverse loop can have the end of a snell of a fish hook anchored thereto.

7. A fishing tackle member consisting of a wire comprising a shank, a pair of integral loops extending from the shank at one end and on opposite sides of the shank, the loops being disposed one in a transverse plane and the other in a parallel plane with respect to the plane of the shank, a portion of the wire being twisted to form the transverse loop and an end portion of the wire extending from the transverse loop in alignment with the shank and back and around the shank in a coil at a point inwardly of the transverse loop to form the parallel loop, said coil being laterally displaced to yieldingly engage the shank at spaced points and terminating in a free end, whereby the loop of the line can be passed thereover and along the coiled portion to snap past the points of engagement between the coil and shank and into the integral parallel loop at the end of the shank, and whereby said transverse loop can have the end of a snell of a fish hook anchored thereto.

8. A fishing tackle member to be connected between a pair of lines, said device consisting of a wire comprising a shank of wire, a pair of integral loops extending from the wire at both ends thereof, the loops of each pair being on opposite sides of the shank and disposed one in a transverse plane and the other in a parallel plane with respect to the plane of the shank, a portion of the wire being twisted to form the transverse loop and an end portion of the wire extending from the transverse loop in alignment with the shank and back and around the shank in a coil at a point inwardly of the transverse loop to form the parallel loop, said coil being laterally displaced to yieldingly engage the shank at spaced points and terminating in a free end, whereby loops of the lines can be passed respectively over said free end and moved along the coil and snapped past the points of engagement between the coil and shank and into the integral parallel loop, and whereby said transverse loop can have the end of a snell of a fish hook or the like anchored thereto.

9. A fishing tackle member consisting of a wire comprising a shank, a pair of integral loops extending from the shank at each end thereof, the loops of each pair being on opposite sides of the shank and disposed one in a transverse plane and the other in a parallel plane with respect to the plane of the shank, a portion of the wire being twisted to form the transverse loop, and an end portion of the wire extending from the transverse loop in alignment with the shank and back and around the shank in a coil at a point inwardly of the transverse loop, to form the parallel loop, said coil being laterally displaced to yieldingly engage the shank at spaced points and terminating in a free end, whereby the free ends of the coils at opposite ends of the shank respectively can have the loop of a fishing line passed thereover, moved along said coil and snapped past the points of engagement between the coil and shank and into the related integral parallel loop, and whereby the snell of a fish hook can be passed through said transverse loop and then through said parallel loop to be anchored to the device so as to project beyond the opposite sides of the shank.

FRED STOGERMAYR.